US012810282B2

(12) United States Patent
Joshi et al.

(10) Patent No.: US 12,810,282 B2
(45) Date of Patent: Nov. 24, 2026

(54) SYSTEM AND METHOD FOR PERFORMING INTERACTIONS BETWEEN COMPUTING SYSTEMS USING NFTs

(71) Applicant: Bank of America Corporation, Charlotte, NC (US)

(72) Inventors: Ravi Joshi, Pennington, NJ (US); Anna Kristen Pingel Berry, Indian Land, SC (US); Olga Caroline Kocharyan, Matthews, NC (US); Luqman Abdul Hakeem Sharief, Libertyville, IL (US); Shweta Ambulkar, Plainsboro, NJ (US); Angela F. Ianni, Lincoln, RI (US); Michael William Whitaker, Fort Worth, TX (US); Benjamin Daniel Hardman, Harrisburg, NC (US)

(73) Assignee: Bank of America Corporation, Charlotte, NC (US)

( * ) Notice: Subject to any disclaimer, the term of this patent is extended or adjusted under 35 U.S.C. 154(b) by 147 days.

(21) Appl. No.: 18/423,702

(22) Filed: Jan. 26, 2024

(65) Prior Publication Data

US 2025/0245648 A1 Jul. 31, 2025

(51) Int. Cl.

| | |
|---|---|
| ***G06Q 20/36*** | (2012.01) |
| ***G06Q 20/38*** | (2012.01) |
| ***G06Q 20/40*** | (2012.01) |

(52) U.S. Cl.

CPC ....... *G06Q 20/3678* (2013.01); *G06Q 20/389* (2013.01); *G06Q 20/401* (2013.01)

(58) Field of Classification Search

CPC . G06Q 20/3678; G06Q 20/389; G06Q 20/401

See application file for complete search history.

(56) References Cited

U.S. PATENT DOCUMENTS

| | | | | |
|---|---|---|---|---|
| 10,922,103 | B2 | 2/2021 | Jones | |
| 11,075,891 | B1 | 7/2021 | Long et al. | |
| 11,348,099 | B2 | 5/2022 | Vijayan | |
| 11,500,972 | B2 | 11/2022 | Goldston et al. | |
| 11,652,605 | B2 | 5/2023 | Turner et al. | |
| 11,676,143 | B2 | 6/2023 | Joveski et al. | |
| 12,321,924 | B1 * | 6/2025 | Kurani | G06Q 40/04 |
| 2021/0133700 | A1 | 5/2021 | Williams et al. | |
| 2022/0016529 | A1 | 1/2022 | Meilich et al. | |
| 2022/0027992 | A1 | 1/2022 | Blevins | |
| 2022/0122062 | A1 | 4/2022 | Mayblum et al. | |

(Continued)

FOREIGN PATENT DOCUMENTS

| | | | | | |
|---|---|---|---|---|---|
| CN | 115271962 | A | | 11/2022 | |
| JP | 2022078115 | A | * | 5/2022 | G06Q 20/02 |

*Primary Examiner* — Jalatee Worjloh

(57) ABSTRACT

A method includes receiving a first NFT from a first user. The first NFT is associated with a first digital folder of the first user. A second NFT is received from a second user. The second NFT is associated with a second digital folder of the second user. The second NFT represents a first interaction request from the second user. A blockchain is searched to identify the first digital folder associated with the first NFT. The blockchain is searched to identify the second digital folder associated with the second NFT. A first interaction corresponding to the first interaction request is performed between the first digital folder and the second digital folder. The first interaction is recorded in a distributed ledger.

20 Claims, 2 Drawing Sheets

(56) References Cited

U.S. PATENT DOCUMENTS

| | | | | |
|---|---|---|---|---|
| 2022/0173893 | A1 | 6/2022 | Basu et al. | |
| 2022/0253834 | A1 | 8/2022 | Vijayan | |
| 2022/0309491 | A1 | 9/2022 | Shapiro et al. | |
| 2023/0070586 | A1* | 3/2023 | Kapur .................. | G06Q 20/123 |
| 2023/0230069 | A1 | 7/2023 | Voorhees et al. | |
| 2023/0291544 | A1 | 9/2023 | Turner et al. | |
| 2024/0403957 | A1* | 12/2024 | Boneta .................. | H04L 9/0643 |

* cited by examiner

SYSTEM AND METHOD FOR PERFORMING INTERACTIONS BETWEEN COMPUTING SYSTEMS USING NFTs

TECHNICAL FIELD

The present disclosure relates generally to interactions between computing systems, and more specifically to a system and method for performing interactions between computing systems using NFTs.

BACKGROUND

Generally different computing systems have different preferred interaction options. Accordingly, interactions with such computing systems need to be addressed on an individual bases. Maintaining the security of these interactions and the underlying computing systems that perform these interactions can be important in certain situations.

SUMMARY

The system described in the present disclosure provides several practical applications and technical advantages that overcome the current technical problems with interaction between computing systems.

In general, a system includes an interaction management system that is operably coupled to a plurality of computing systems of a plurality of users, an NFT generator, and a blockchain network via a network. In operation, the NFT generator generates a first NFT and sends the first NFT to a computing system of a first user. The computing system of the first user stores the first NFT in a first digital folder of the computing system of the first user. The NFT generator generates a second NFT and sends the second NFT to a computing system of a second user. The computing system of the second user stores the second NFT in a second digital folder of the computing system of the second user. In certain embodiments, the second NFT represents an interaction request for an interaction to be performed between the computing system of the first user and the computing system of the second user. In certain embodiments when the second user is a service provider and the first user is a customer, the second NFT may represent a bill for services that are provided by the service provider to the customer.

The interaction management system receives the first NFT from the computing system of the first user and the second NFT from the computing system of the second user. The interaction management system determines whether a notification that the first NFT was moved to a third digital folder of the computing system of the first user is received. In response to determining that the notification that the first NFT was moved to the third digital folder of the computing system of the first user is not received, the interaction management system searches a blockchain that is stored in a memory of the interaction management system to identify the first digital folder associated with the first NFT and to identify the second digital folder associated with the second NFT.

The interaction management system performs an interaction between the first digital folder of the computing system of the first user and the second digital folder of the computing system of the second user. In certain embodiments, the interaction comprises transferring digital asserts from the first digital folder of the computing system of the first user to the second digital folder of the computing system of the second user. The interaction management system records the performed interaction in a distributed ledger (e.g., blockchain network).

In response to determining that the notification that the first NFT was moved to the third digital folder of the computing system of the first user is received, the interaction management system records an association of the first NFT with the third digital folder of the computing system of the first user in the blockchain of the interaction management system. The interaction management system searches the blockchain that is stored in the memory of the interaction management system to identify the third digital folder associated with the first NFT and to identify the second digital folder associated with the second NFT.

The interaction management system performs an interaction between the third digital folder of the computing system of the first user and the second digital folder of the computing system of the second user. In certain embodiments, the interaction comprises transferring digital assets from the third digital folder of the computing system of the first user to the second digital folder of the computing system of the second user. The interaction management system records the performed interaction in a distributed ledger (e.g., blockchain network).

The present disclosure provides various advantages. The system allows for effectively performing interactions between different computing systems that have different interaction preferences by using non-fungible tokens. By using non-fungible tokens, computing resources (e.g., memory, network bandwidth, etc.) that would otherwise be used while performing interactions between computing systems may be saved and used for other purposes. Accordingly, the following disclosure is particularly integrated into practical applications of: (1) performing interactions between computing systems using non-fungible tokens; and (2) improving computing resource utilization while performing interactions between computing systems. In addition, performing the interactions using NFTs increases the security of the interaction and the underlying technology used to perform the interaction, such as the computer systems and communication network.

In one embodiment, a system includes a memory and a processor operably coupled to the memory. The memory is configured to store a blockchain comprising associations of non-fungible tokens (NFTs) with digital folders. The processor is configured to receive a first NFT from a first user. The first NFT is associated with a first digital folder of the first user. The processor is further configured to receive a second NFT from a second user. The second NFT is associated with a second digital folder of the second user. The second NFT represents a first interaction request from the second user. The processor is further configured to determine whether a notification that that the first NFT was moved to a third digital folder of the first user is received. In response to determining that the notification that that the first NFT was moved to a third digital folder of the first user is not received, the processor is further configured to search the blockchain to identify the first digital folder associated with the first NFT, search the blockchain to identify the second digital folder associated with the second NFT, perform a first interaction corresponding to the first interaction request between the first digital folder and the second digital folder, and record the first interaction in a distributed ledger.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, where like reference numerals represent like parts.

DETAILED DESCRIPTION

Figure 1:
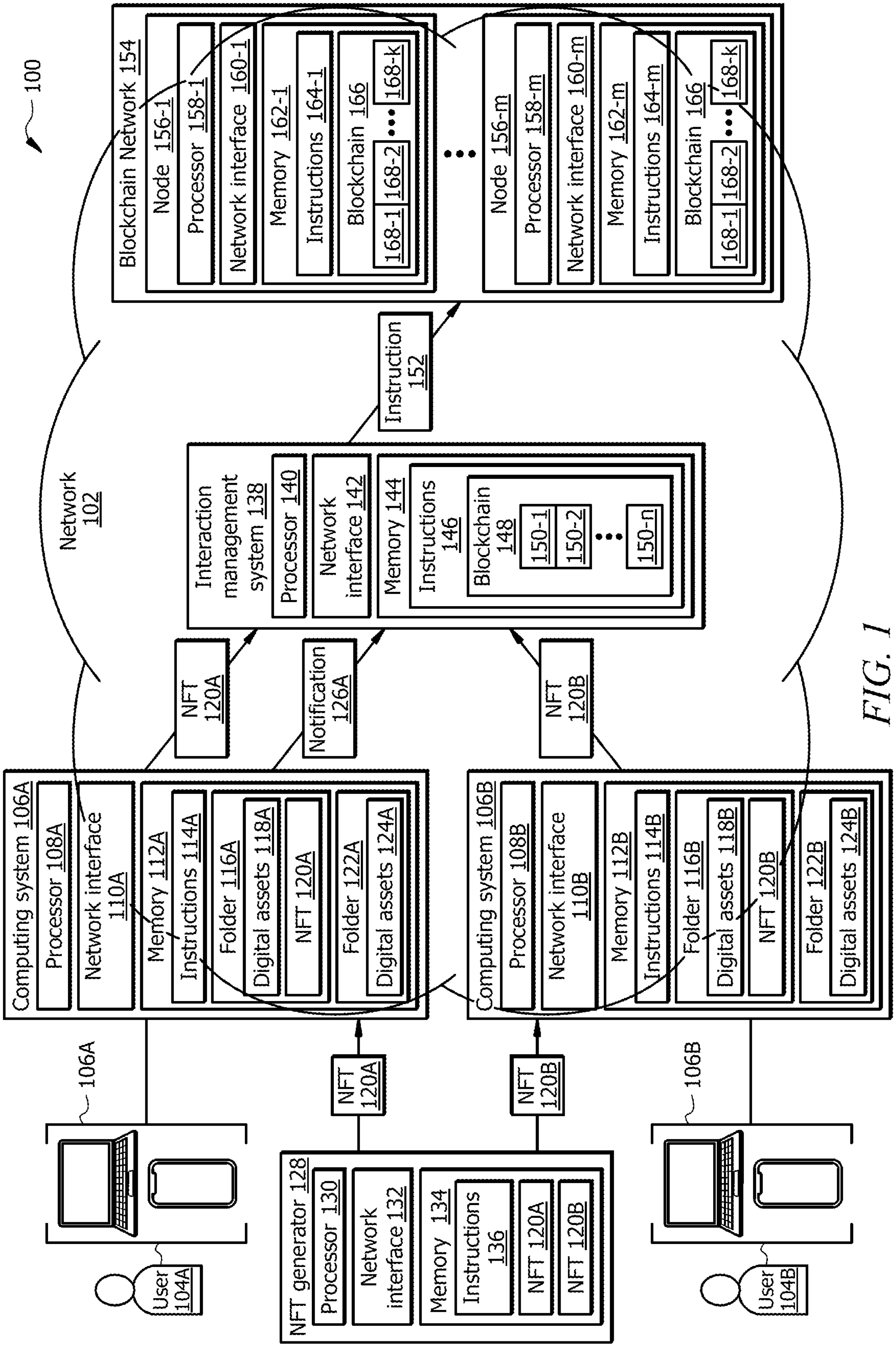
FIG. 1 illustrates an embodiment of a system configured for performing interactions between computing systems using NFTs.
Figure 2:
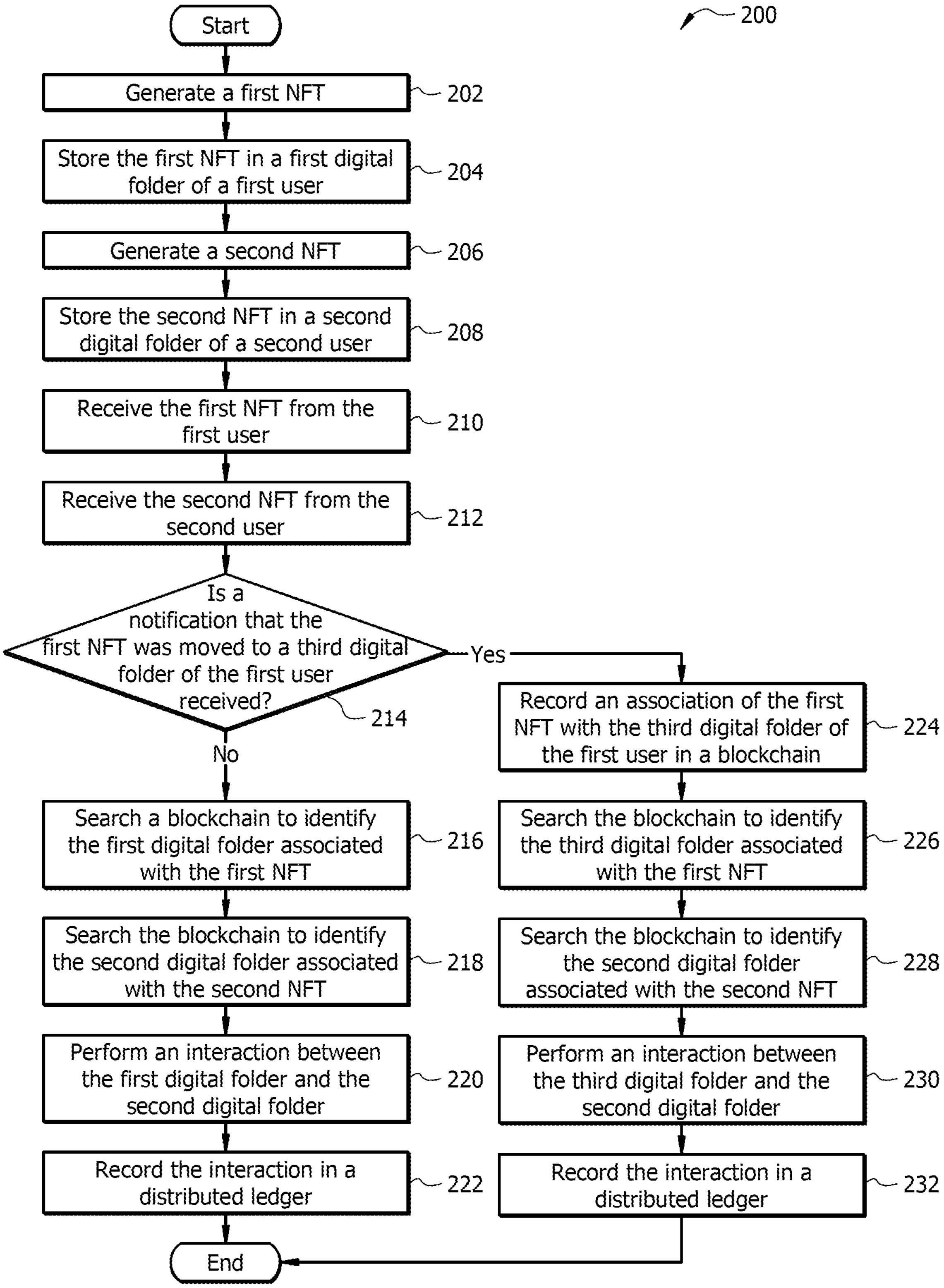
FIG. 2 illustrates an example operational flow of system of FIG. 1 for performing interactions between computing systems using NFTs.

As described above, previous technologies fail to provide solutions for interactions between computing systems. Embodiments of the present disclosure and its advantages may be understood by referring to FIGS. 1 and 2. FIGS. 1 and 2 are used to describe a system and method for performing interactions between computing systems using non-fungible tokens (NFTs).

System Overview

FIG. 1 illustrates an embodiment of a system 100 that is generally configured for performing interactions between computing systems using NFTs. In certain embodiments, the system 100 comprises an interaction management system 138 that is operably coupled to a plurality of computing systems (e.g., computing systems 106A and 106B) of a plurality of users (e.g., users 104A and 104B), an NFT generator 128, and a blockchain network 154 via a network 102. Network 102 enables the communication between the components of the system 100. The computing systems 106A and 106B may be also referred to as user devices. The blockchain network 154 comprises a peer-to-peer network of nodes 156-1 through **156-*m*. In other embodiments, system 100 may not have all the components listed and/or may have other elements instead of, or in addition to, those listed above. For example, the NFT generator 128 may be integrated into the interaction management system 138**.

In general, the NFT generator 128 generates a first NFT 120A and sends the first NFT 120A to the computing system 106A of the first user 104A. The computing system 106A stores the first NFT 120A in a first digital folder 116A of the computing system 106A of the first user 104A. The NFT generator 128 generates a second NFT 120B and sends the second NFT 120B to a computing system 106B of a second user 104B. The computing system 106B stores the second NFT 120B in a second digital folder 116B of the computing system 106B of the second user 104B. In certain embodiments, the second NFT 120B represents an interaction request for an interaction to be performed between the computing system 106A of the first user 104A and the computing system 106B of the second user 104B. In certain embodiments when the second user 104B is a service provider and the first user 104A is a customer, the second NFT 120B may represent a bill for services that are provided by the service provider to the customer.

The interaction management system 138 receives the first NFT 120A from the computing system 106A of the first user 104A and the second NFT 120B from the computing system 106B of the second user 104B. The interaction management system 138 determines whether a notification 126A that the first NFT 120A was moved to a third digital folder (e.g., digital folder 122A) of the computing system 106A of the first user 104A is received. In response to determining that the notification 126A that the first NFT 120A was moved to the third digital folder (e.g., digital folder 122A) of the computing system 106A of the first user 104A is not received, the interaction management system 138 searches a blockchain 148 that is stored in a memory 144 of the interaction management system 138 to identify the first digital folder 116A associated with the first NFT 120A and to identify the second digital folder 116B associated with the second NFT 120B.

The interaction management system 138 performs an interaction between the first digital folder 116A of the computing system 106A of the first user 104A and the second digital folder 116B of the computing system 106B of the second user 104B. In certain embodiments, the interaction comprises transferring digital assets 118A from the first digital folder 116A of the computing system 106A of the first user 104A to the second digital folder 116B of the computing system 106B of the second user 104B. The interaction management system 138 records the performed interaction in a distributed ledger (e.g., blockchain network 154).

In response to determining that the notification 126A that the first NFT 120A was moved to the third digital folder (e.g., digital folder 122A) of the computing system 106A of the first user 104A is received, the interaction management system 138 records an association of the first NFT 120A with the third digital folder (e.g., digital folder 122A) of the computing system 106A of the first user 104A in the blockchain 148 of the interaction management system 138. The interaction management system 138 searches the blockchain 148 that is stored in the memory 144 of the interaction management system 138 to identify the third digital folder (e.g., digital folder 122A) associated with the first NFT 120A and to identify the second digital folder 116B associated with the second NFT 120B.

The interaction management system 138 performs an interaction between the third digital folder (e.g., digital folder 122A) of the computing system 106A of the first user 104A and the second digital folder 116B of the computing system 106B of the second user 104B. In certain embodiments, the interaction comprises transferring digital assets 124A from the third digital folder (e.g., digital folder 122A) of the computing system 106A of the first user 104A to the second digital folder 116B of the computing system 106B of the second user 104B. The interaction management system 138 records the performed interaction in a distributed ledger (e.g., blockchain network 154).

System Components

Network

Network 102 may be any suitable type of wireless and/or wired network. Network 102 may or may not be connected to the Internet or public network. Network 102 may include all or a portion of an Intranet, a peer-to-peer network, a switched telephone network, a local area network (LAN), a wide area network (WAN), a metropolitan area network (MAN), a personal area network (PAN), a wireless PAN (WPAN), an overlay network, a software-defined network (SDN), a virtual private network (VPN), a mobile telephone network (e.g., cellular networks, such as 4G or 5G), a plain old telephone (POT) network, a wireless data network (e.g., WiFi, WiGig, WiMax, etc.), a long-term evolution (LTE) network, a universal mobile telecommunications system (UMTS) network, a peer-to-peer (P2P) network, a Bluetooth network, a near field communication (NFC) network, and/or any other suitable network. Network 102 may be configured to support any suitable type of communication protocol as would be appreciated by one of ordinary skill in the art.

Computing Systems

The computing systems 106A and 106B are generally any devices that are configured to process data and interact with the users 104A and 104B. The computing systems 106A and 106B may be also referred to as user devices. In certain embodiments, the computing system 106A may be a customer device and the computing system 106B may be a service provider device. Examples of the computing systems 106A and 106B include, but are not limited to, a personal computer, a desktop computer, a workstation, a server, a laptop, a tablet computer, a mobile phone (such as a smartphone), a virtual reality headset, etc. The computing systems 106A and 106B may include a user interface, such as a display, a microphone, keypad, or other appropriate terminal equipment usable by the users 104A and 104B. Each of the computing systems 106A and 106B further comprises a respective one of processors 108A and 108B in signal communication with a respective one of memories 112A and 112B and a respective one of network interfaces 110A and 110B. Each of the processors 108A and 108B may comprise one or more processors operably coupled to a respective one of the memories 112A and 112B.

Each of the processors 108A and 108B is any electronic circuitry, including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). Each of the processors 108A and 108B may be a programmable logic device, a microcontroller, a microprocessor, or any suitable combination of the preceding. The one or more processors are configured to process data and may be implemented in hardware or software. For example, each of the processors 108A and 108B may be 8-bit, 16-bit, 32-bit, 64-bit, or of any other suitable architecture. Each of the processors 108A and 108B is configured to implement various software instructions. For example, each of the processors 108A and 108B is configured to execute respective ones of software instructions 114A and 114B that are stored in a respective one of the memories 112A and 112B in order to perform the operations described herein.

Each of the network interfaces 110A and 110B is configured to enable wired and/or wireless communications (e.g., via network 102). Each of the network interfaces 110A and 110B is configured to communicate data between a respective one of the computing systems 106A and 106B and other components of the system 100. For example, each of the network interfaces 110A and 110B may comprise a WIFI interface, a local area network (LAN) interface, a wide area network (WAN) interface, a modem, a switch, or a router. Each of the network interfaces 110A and 110B may be configured to use any suitable type of communication protocol as would be appreciated by one of ordinary skill in the art.

Each of the memories 112A and 112B comprises a non-transitory computer-readable medium such as one or more disks, tape drives, or solid-state drives, and may be used as an over-flow data storage device, to store programs when such programs are selected for execution, and to store instructions and data that are read during program execution. Each of the memories 112A and 112B may be volatile or non-volatile and may comprise a read-only memory (ROM), random-access memory (RAM), ternary content-addressable memory (TCAM), dynamic random-access memory (DRAM), and static random-access memory (SRAM). Each of the memories 112A and 112B may be implemented using one or more disks, tape drives, solid-state drives, and/or the like. Each of the memories 112A and 112B may store any of the information described in FIGS. 1 and 2 along with any other data, instructions, logic, rules, or code operable to implement the function(s) described herein. Each of the memories 112A and 112B is operable to store respective ones of software instructions 114A and 114B, and/or any other data and instructions. Each of the software instructions 114A and 114B may comprise any suitable set of software instructions, logic, rules, or code operable to be executed by respective one of the processors 108A and 108B.

Each of the memories 112A and 112B is further configured to store a respective one of folders 116A through 116D. Each of the folders 116A through 116D comprises a respective one of digital assets 118A through 118D. In certain embodiments, each of the digital assets 118A through 118D may comprise cryptocurrencies (e.g., Bitcoin, Ethereum, etc.), non-fungible tokens (NFTs), and/or any suitable data items. In such embodiments, the folders 116A through 116D may be also referred to as digital wallets.

Memory 112A is further configured to store a plurality of digital folders (e.g., digital folders 116A and 122A). Each of the digital folders 116A and 122A comprises a respective one of digital assets 118A and 124A. In certain embodiments, each of the digital assets 118A and 124A may comprise cryptocurrencies (e.g., Bitcoin, Ethereum, etc.), and/or any suitable data items. In such embodiments, the digital folders 116A and 122A may be also referred to as digital wallets. In certain embodiments, the digital folder 116A further comprises an NFT 120A. The NFT 120A is associated with the digital folder 116A and the respective digital assets 118A. In certain embodiments, the digital assets 118A are different from the digital assets 124A.

Memory 112B is further configured to store a plurality of digital folders (e.g., digital folders 116B and 122B). Each of the digital folders 116B and 122B comprises a respective one of digital assets 118B and 124B. In certain embodiments, each of the digital assets 118B and 124B may comprise cryptocurrencies (e.g., Bitcoin, Ethereum, etc.), and/or any suitable data items. In such embodiments, the digital folders 116B and 122B may be also referred to as digital wallets. In certain embodiments, the digital folder 116B further comprises an NFT 120B. The NFT 120B is associated with the digital folder 116B and the respective digital assets 118B. In certain embodiments, the digital assets 118B are different from the digital assets 124B.

In operation, the computing system 106A receives the NFT 120A from the NFT generator 128 and the computing system 106B receives the NFT 120B from the NFT generator 128. To perform an interaction between the computing system 106A and the computing system 106B, the computing system 106A sends the NFT 120A to the interaction management system 138 and the computing system 106B sends the NFT 120B to the interaction management system 138.

NFT Generator

The NFT generator 128 is generally any device (or group of distributed devices) that is configured to process data and communicate with other components of the system 100 via the network 102. The NFT generator 128 may comprise a processor 130 in signal communication with a memory 134 and a network interface 132.

Processor 130 comprises one or more processors operably coupled to the memory 134. Processor 130 is any electronic circuitry, including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). Processor 130 may be a programmable logic device, a microcontroller, a microprocessor, or any suitable combination of the preceding. The one or more processors are configured to process data and may be implemented in hardware or software. Processor 130 may be 8-bit, 16-bit, 32-bit, 64-bit, or of any other suitable architecture. The one or more processors are configured to implement various software instructions to perform the operations described herein. For example, the one or more processors are configured to execute software instructions 136 to perform one or more functions of the NFT generator 128 described herein.

Network interface 132 is configured to enable wired and/or wireless communications (e.g., via network 102). Network interface 132 is configured to communicate data between the NFT generator 128 and other components of the system 100. For example, the network interface 132 may comprise a WIFI interface, a local area network (LAN) interface, a wide area network (WAN) interface, a modem, a switch, or a router. Processor 130 is configured to send and receive data using the network interface 132. Network interface 132 may be configured to use any suitable type of communication protocol as would be appreciated by one of ordinary skill in the art.

The memory 134 comprises a non-transitory computer-readable medium such as one or more disks, tape drives, or solid-state drives, and may be used as an over-flow data storage device, to store programs when such programs are selected for execution, and to store instructions and data that are read during program execution. Memory 134 may be volatile or non-volatile and may comprise a read-only memory (ROM), random-access memory (RAM), ternary content-addressable memory (TCAM), dynamic random-access memory (DRAM), and static random-access memory (SRAM). Memory 134 may be implemented using one or more disks, tape drives, solid-state drives, and/or the like. Memory 134 may store any of the information described in FIGS. 1 and 2 along with any other data, instructions, logic, rules, or code operable to implement the function(s) described herein. Memory 134 is operable to store software instructions 136 and/or any other data and instructions. The software instructions 136 may comprise any suitable set of software instructions, logic, rules, or code operable to be executed by processor 130.

In operation, the NFT generator 128 is configured to generate a plurality of NFTs (e.g., NFTs 120A and 120B). The NFT generator 128 is further configured to send the NFT 120A to the computing system 106A and the NFT 120B to the computing system 106B.

Interaction Management System

The interaction management system 138 is generally any device (or group of distributed devices) that is configured to process data and communicate with other components of the system 100 via the network 102. The interaction management system 138 may comprise a processor 140 in signal communication with a memory 144 and a network interface 142.

Processor 140 comprises one or more processors operably coupled to the memory 144. Processor 140 is any electronic circuitry, including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). Processor 140 may be a programmable logic device, a microcontroller, a microprocessor, or any suitable combination of the preceding. The one or more processors are configured to process data and may be implemented in hardware or software. Processor 140 may be 8-bit, 16-bit, 32-bit, 64-bit, or of any other suitable architecture. The one or more processors are configured to implement various software instructions to perform the operations described herein. For example, the one or more processors are configured to execute software instructions 146 to perform one or more functions of the interaction management system 138 described herein.

Network interface 142 is configured to enable wired and/or wireless communications (e.g., via network 102). Network interface 142 is configured to communicate data between the interaction management system 138 and other components of the system 100. For example, network interface 142 may comprise a WIFI interface, a local area network (LAN) interface, a wide area network (WAN) interface, a modem, a switch, or a router. Processor 140 is configured to send and receive data using the network interface 142. Network interface 142 may be configured to use any suitable type of communication protocol as would be appreciated by one of ordinary skill in the art.

The memory 144 comprises a non-transitory computer-readable medium such as one or more disks, tape drives, or solid-state drives, and may be used as an over-flow data storage device, to store programs when such programs are selected for execution, and to store instructions and data that are read during program execution. Memory 144 may be volatile or non-volatile and may comprise a read-only memory (ROM), random-access memory (RAM), ternary content-addressable memory (TCAM), dynamic random-access memory (DRAM), and static random-access memory (SRAM). Memory 144 may be implemented using one or more disks, tape drives, solid-state drives, and/or the like. Memory 144 may store any of the information described in FIGS. 1 and 2 along with any other data, instructions, logic, rules, or code operable to implement the function(s) described herein. Memory 144 is operable to store software instructions 146 and/or any other data and instructions. The software instructions 146 may comprise any suitable set of software instructions, logic, rules, or code operable to be executed by processor 140.

The memory 144 is further configured to store a blockchain 148. The blockchain 148 is configured to record associations of NFTs to respective digital folders. In the illustrated embodiments, the blockchain 148 records the association of the NFT 120A with the digital folder 116A and the association of the NFT 120B with the digital folder 116B. In certain embodiments, the blockchain 148 comprises a plurality of blocks (e.g., blocks 150-1 through **150-*n***).

In operation, the processor 140 of the interaction management system 138 receives the first NFT 120A from the computing system 106A of the first user 104A and the second NFT 120B from the computing system 106B of the second user 104B. In certain embodiments, the second NFT 120B represents an interaction request for an interaction to be performed between the computing system 106A of the first user 104A and the computing system 106B of the second user 104B. In certain embodiments when the second user 104B is a service provider and the first user 104A is a customer, the second NFT 120B may represent a bill for services that are provided by the service provider to the customer.

The processor 140 of the interaction management system 138 determines whether a notification 126A that the first NFT 120A was moved to a third digital folder (e.g., digital folder 122A) of the computing system 106A of the first user 104A is received. In response to determining that the notification 126A that the first NFT 120A was moved to the third digital folder (e.g., digital folder 122A) of the computing system 106A of the first user 104A is not received, the processor 140 of the interaction management system 138 searches a blockchain 148 that is stored in a memory 144 of the interaction management system 138 to identify the first digital folder 116A associated with the first NFT 120A and to identify the second digital folder 116B associated with the second NFT 120B.

The processor 140 of the interaction management system 138 performs an interaction between the first digital folder 116A of the computing system 106A of the first user 104A and the second digital folder 116B of the computing system 106B of the second user 104B. In certain embodiments, the interaction comprises transferring digital assets 118A from the first digital folder 116A of the computing system 106A of the first user 104A to the second digital folder 116B of the computing system 106B of the second user 104B. The processor 140 of the interaction management system 138 records the performed interaction in a distributed ledger (e.g., blockchain network 154). In certain embodiments, the processor 140 of the interaction management system 138 sends an instruction 152 to the blockchain network 154 to record the performed interaction in the blockchain 166 of the blockchain network 154.

In response to determining that the notification 126A that the first NFT 120A was moved to the third digital folder (e.g., digital folder 122A) of the computing system 106A of the first user 104A is received, the processor 140 of the interaction management system 138 records an association of the first NFT 120A with the third digital folder (e.g., digital folder 122A) of the computing system 106A of the first user 104A in the blockchain 148 of the interaction management system 138. The processor 140 of the interaction management system 138 searches the blockchain 148 that is stored in the memory 144 of the interaction management system 138 to identify the third digital folder (e.g., digital folder 122A) associated with the first NFT 120A and to identify the second digital folder 116B associated with the second NFT 120B.

The processor 140 of the interaction management system 138 performs an interaction between the third digital folder (e.g., digital folder 122A) of the computing system 106A of the first user 104A and the second digital folder 116B of the computing system 106B of the second user 104B. In certain embodiments, the interaction comprises transferring digital assets 124A from the third digital folder (e.g., digital folder 122A) of the computing system 106A of the first user 104A to the second digital folder 116B of the computing system 106B of the second user 104B. The processor 140 of the interaction management system 138 records the performed interaction in a distributed ledger (e.g., blockchain network 154). In certain embodiments, the processor 140 of the interaction management system 138 sends an instruction 152 to the blockchain network 154 to record the performed interaction in the blockchain 166 of the blockchain network 154.

Blockchain Network

The blockchain network 154 comprises a peer-to-peer network of nodes 156-1 through 156-*m* and is configured to record interactions between the computing systems 106A and 106B in a blockchain 166. The blockchain network 154 may be also referred to as a distributed ledger. In certain embodiments, the interactions between the computing systems 106A and 106B may comprise exchanges of the digital assets (e.g., digital assets 118A). Each of the nodes 156-1 through 156-*m* is generally any device that is configured to process data and communicate with other components of the system 100 via the network 102. Each of the nodes 156-1 through 156-*m* comprises a respective one of processors 158-1 through 158-*m* in signal communication with a respective one of memories 162-1 through 162-*m* and a respective one of network interfaces 160-1 through 160-*m*. Each of the processors 158-1 through 158-*m* may comprise one or more processors operably coupled to a respective one of the memories 162-1 through 162-*m*.

Each of the processors 158-1 through 158-*m* is any electronic circuitry, including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). Each of the processors 158-1 through 158-*m* may be a programmable logic device, a microcontroller, a microprocessor, or any suitable combination of the preceding. The one or more processors are configured to process data and may be implemented in hardware or software. For example, each of the processors 158-1 through 158-*m* may be 8-bit, 16-bit, 32-bit, 64-bit, or of any other suitable architecture. Each of the processors 158-1 through 158-*m* is configured to implement various software instructions. For example, each of the processors 158-1 through 158-*m* is configured to execute respective ones of software instructions 164-1 through 164-*m* that are stored in a respective one of the memories 162-1 through 162-*m* in order to perform the operations described herein.

Each of the network interfaces 160-1 through 160-*m* is configured to enable wired and/or wireless communications (e.g., via network 102). Each of the network interfaces 160-1 through 160-*m* is configured to communicate data between a respective one of the nodes 156-1 through 156-*m* and other components of the system 100. For example, each of the network interfaces 160-1 through 160-*m* may comprise a WIFI interface, a local area network (LAN) interface, a wide area network (WAN) interface, a modem, a switch, or a router. Each of the network interfaces 160-1 through 160-*m* may be configured to use any suitable type of communication protocol as would be appreciated by one of ordinary skill in the art.

Each of the memories 162-1 through 162-*m* comprises a non-transitory computer-readable medium such as one or more disks, tape drives, or solid-state drives, and may be used as an over-flow data storage device, to store programs when such programs are selected for execution, and to store instructions and data that are read during program execution. Each of the memories 162-1 through 162-*m* may be volatile or non-volatile and may comprise a read-only memory (ROM), random-access memory (RAM), ternary content-addressable memory (TCAM), dynamic random-access memory (DRAM), and static random-access memory (SRAM). Each of the memories 162-1 through 162-*m* may be implemented using one or more disks, tape drives, solid-state drives, and/or the like. Each of the memories 162-1 through 162-*m* may store any of the information described in FIGS. 1 and 2 along with any other data, instructions, logic, rules, or code operable to implement the function(s) described herein. Each of the memories 162-1 through 162-*m* is operable to store respective ones of software instructions 164-1 through 164-*m*, and/or any other data and instructions. Each of the software instructions 164-1 through 164-*m* may comprise any suitable set of software instructions, logic, rules, or code operable to be executed by respective one of the processors 158-1 through **158-*m*. Each of the memories 162-1 through 162-*m* is further configured to store a copy of a blockchain 166. In certain embodiments, the blockchain 166 comprises a plurality of blocks (e.g., blocks 168-1 through 168-*k***).

In operation, the blockchain network 154 is configured to receive instructions (e.g., instruction 152) to record interactions performed between the computing system 106A of the user 104A and the computing system 106B of the user 10A in the blockchain 166.

Example Method for Performing Interaction Between Computing Systems Using NFTs

FIG. 2 illustrates an example flowchart of a method 200 for performing interaction between computing systems using NFTs. Modifications, additions, or omissions may be made to method 200. Method 200 may include more, fewer, or other operations. For example, operations may be performed in parallel or in any suitable order. For example, one or more operations of method 200 may be implemented, at least in part, in the form of the software instructions (e.g., software instructions 114A, 114B, 136, 146, and/or 164-1 through **164-*m* of FIG. 1), stored on non-transitory, tangible, machine-readable medium (e.g., memories 112A, 112B, 134, 144, and/or 162-1 through 162-*m* of FIG. 1) that when executed by one or more processors (e.g., processors 108A, 108B, 130, 140, and/or 158-1 through 158-*m* of FIG. 1) may cause the one or more processors to perform operations 202-232**.

Method 200 starts with operation 202, where a processor 130 of an NFT generator 128 generates a first NFT 120A and sends the first NFT 120A to a computing system 106A of a first user 104A. At operation 204, the processor 108A of the computing system 106A stores the first NFT 120A in a first digital folder 116A of the computing system 106A of the first user 104A. At operation 206, the processor 130 of the NFT generator 128 generates a second NFT 120B and sends the second NFT 120B to a computing system 106B of a second user 104B. At operation 208, the processor 108B of the computing system 106B stores the second NFT 120B in a second digital folder 116B of the computing system 106B of the second user 104B. In certain embodiments, the second NFT 120B represents an interaction request for an interaction to be performed between the computing system 106A of the first user 104A and the computing system 106B of the second user 104B. In certain embodiments when the second user 104B is a service provider and the first user 104A is a customer, the second NFT 120B may represent a bill for services that are provided by the service provider to the customer.

At operation 210, the processor 140 of the interaction management system 138 receives the first NFT 120A from the computing system 106A of the first user 104A. At operation 212, the processor 140 of the interaction management system 138 receives the second NFT 120B from the computing system 106B of the second user 104B. At operation 214, the processor 140 of the interaction management system 138 determines whether a notification 126A that the first NFT 120A was moved to a third digital folder (e.g., digital folder 122A of FIG. 1) of the computing system 106A of the first user 104A is received.

In response to determining at operation 214 that the notification 126A that the first NFT 120A was moved to the third digital folder (e.g., digital folder 122A of FIG. 1) of the computing system 106A of the first user 104A is not received, method 200 proceeds to operation 216. At operation 216, the processor 140 of the interaction management system 138 searches a blockchain 148 that is stored in a memory 144 of the interaction management system 138 to identify the first digital folder 116A associated with the first NFT 120A. At operation 218, the processor 140 of the interaction management system 138 searches the blockchain 148 that is stored in the memory 144 of the interaction management system 138 to identify the second digital folder 116B associated with the second NFT 120B.

At operation 220, the processor 140 of the interaction management system 138 performs an interaction between the first digital folder 116A of the computing system 106A of the first user 104A and the second digital folder 116B of the computing system 106B of the second user 104B. In certain embodiments, the interaction comprises transferring digital assets 118A from the first digital folder 116A of the computing system 106A of the first user 104A to the second digital folder 116B of the computing system 106B of the second user 104B. At operation 222, the processor 140 of the interaction management system 138 records the performed interaction in a distributed ledger (e.g., blockchain network 154 of FIG. 1). In certain embodiments, the processor 140 of the interaction management system 138 sends an instruction 152 to the blockchain network 154 to record the performed interaction in the blockchain 166 of the blockchain network 154. After performing operation 222, method 200 proceeds to end.

In response to determining at operation 214 that the notification 126A that the first NFT 120A was moved to the third digital folder (e.g., digital folder 122A of FIG. 1) of the computing system 106A of the first user 104A is received, method 200 proceeds to operation 224. At operation 224, the processor 140 of the interaction management system 138 records an association of the first NFT 120A with the third digital folder (e.g., digital folder 122A) of the computing system 106A of the first user 104A in the blockchain 148 of the interaction management system 138. At operation 226, the processor 140 of the interaction management system 138 searches the blockchain 148 that is stored in the memory 144 of the interaction management system 138 to identify the third digital folder (e.g., digital folder 122A of FIG. 1) associated with the first NFT 120A. At operation 228, the processor 140 of the interaction management system 138 searches the blockchain 148 that is stored in the memory 144 of the interaction management system 138 to identify the second digital folder 116B associated with the second NFT 120B.

At operation 230, the processor 140 of the interaction management system 138 performs an interaction between the third digital folder (e.g., digital folder 122A of FIG. 1) of the computing system 106A of the first user 104A and the second digital folder 116B of the computing system 106B of the second user 104B. In certain embodiments, the interaction comprises transferring digital assets 124A from the third digital folder (e.g., digital folder 122A of FIG. 1) of the computing system 106A of the first user 104A to the second digital folder 116B of the computing system 106B of the second user 104B. At operation 232, the processor 140 of the interaction management system 138 records the performed interaction in a distributed ledger (e.g., blockchain network 154 of FIG. 1). In certain embodiments, the processor 140 of the interaction management system 138 sends an instruction 152 to the blockchain network 154 to record the performed interaction in the blockchain 166 of the blockchain network 154. After performing operation 232, method 200 proceeds to end.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system comprising:

an NFT generator comprising a first memory and a first processor, wherein the first processor is configured to:

generate a first NFT and a second NFT, wherein the second NFT is generated based at least on a first interaction to be performed between a first computing system and a second computing system;

store the first NFT and the second NFT in the first memory;

transmit the first NFT to the first computing system; and transmit the second NFT to the second computing system:

an interaction management system comprising a second memory and a second processor, wherein the second memory is configured to store:

associations of non-fungible tokens (NFTs) with digital folders; and a second processor operably coupled to the second memory and configured to:

receive the first NFT from the first computing system, wherein:

the first NFT is associated with a first digital folder;

the first digital folder is related to the first computing system; and the first NFT comprising information about digital assets stored in the first digital folder;

receive the second NFT from the second computing system, wherein:

the second NFT is associated with a second digital folder;

the second digital folder is related to the second computing system; and the second NFT comprises a first request from the second computing system for the first interaction to be performed between the first computing system and the second computing system;

determine whether a notification comprising information relating to movement of the first NFT from the first digital folder to a third digital folder is received, wherein the third digital folder is related to the first computing system;

in response to determining that the notification is not received, search a blockchain stored in the second memory to identify an association of the first NFT with the first digital folder prior to searching a first plurality of nodes in a blockchain network;

search the first plurality of nodes in the blockchain network to identify the first digital folder associated with the first NFT;

search a second plurality of nodes in the blockchain to identify the second digital folder associated with the second NFT, wherein each node of the first plurality of nodes and each node of the second plurality of nodes stores a respective copy of the blockchain of the blockchain network;

establish a communication between the first plurality of nodes and the second plurality of nodes; and perform, based at least in part upon the information about the digital assets stored in the first digital folder, the first interaction corresponding to the first request between the first digital folder and the second digital folder over the communication, the first interaction comprising transferring the digital assets from the first digital folder to the second digital folder.

2. The system of claim 1, wherein the notification is received from the first computing system.

3. The system of claim 1, wherein the second processor is further configured to, in response to determining that the notification is received:

associate the first NFT with the third digital folder in the blockchain network;

search the blockchain network to identify the third digital folder associated with the first NFT;

search the blockchain network to identify the second digital folder associated with the second NFT; and perform, based at least in part upon the information about the digital assets stored in the third digital folder, a second interaction corresponding to the first request between the third digital folder and the second digital folder.

4. The system of claim 3, wherein the second interaction comprises transferring the digital assets from the third digital folder to the second digital folder.

5. The system of claim 3, wherein:

the first digital folder comprises first additional digital assets;

the second digital folder comprises second additional digital assets; and the first additional digital assets are different from the second additional digital assets.

6. The system of claim 1, wherein the second processor is further configured to:

record an association of the first NFT with the first digital folder in the blockchain network; and record an association of the second NFT with the second digital folder in the blockchain network.

7. The system of claim 1, further comprising an NFT generator configured to generate the first NFT and the second NFT.

8. A method comprising:

generating a first NFT and a second NFT;

storing the first NFT and the second NFT, wherein the second NFT is generated based at least on a first interaction to be performed between a first computing system and a second computing system;

transmitting the first NFT to the first computing system;
transmitting the second NFT to the second computing system:
receiving the first NFT from the first computing system, wherein:
the first NFT is associated with a first digital folder;
the first digital folder is related to the first computing system; and
the first NFT comprising information about digital assets stored in the first digital folder;
receiving the second NFT from the second computing system, wherein:
the second NFT is associated with a second digital folder;
the second digital folder is related to the second computing system; and
the second NFT comprises a first request from the second computing system for the first interaction to be performed between the first computing system and the second computing system;
determining whether a notification comprising information relating to movement of the first NFT from the first digital folder to a third digital folder is received, wherein the third digital folder is related to the first computing system;
in response to determining that the notification is not received, searching a blockchain stored in a memory to identify an association of the first NFT with the first digital folder prior to searching a first plurality of nodes in a blockchain network;
searching the first plurality of nodes in the blockchain network to identify the first digital folder associated with the first NFT;
searching a second plurality of nodes in the blockchain network to identify the second digital folder associated with the second NFT, wherein each node of the first plurality of nodes and each node of the second plurality of nodes stores a respective copy of the blockchain of the blockchain network;
establishing a communication between the first plurality of nodes and the second plurality of nodes; and
performing, based at least in part upon the information about the digital assets stored in the first digital folder, the first interaction corresponding to the first request between the first digital folder and the second digital folder over the communication, the first interaction comprising transferring the digital assets from the first digital folder to the second digital folder.

9. The method of claim 8, wherein the notification is received from the first computing system.

10. The method of claim 8, further comprising, in response to determining that the notification is received:
associating the first NFT with the third digital folder in the blockchain network;
searching the blockchain network to identify the third digital folder associated with the first NFT;
searching the blockchain network to identify the second digital folder associated with the second NFT; and
performing, based at least in part upon the information about the digital assets stored in the third digital folder, a second interaction corresponding to the first request between the third digital folder and the second digital folder.

11. The method of claim 10, wherein the second interaction comprises transferring the digital assets from the third digital folder to the second digital folder.

12. The method of claim 10, wherein:
the first digital folder comprises first additional digital assets;
the second digital folder comprises second additional digital assets; and
the first additional digital assets are different from the second additional digital assets.

13. The method of claim 8, further comprising:
recording an association of the first NFT with the first digital folder in the blockchain network; and
recording an association of the second NFT with the second digital folder in the blockchain network.

14. The method of claim 8, further comprising generating the first NFT and the second NFT.

15. A non-transitory computer-readable medium storing instructions that, when executed by one or more processors, cause the one or more processors to:
generate a first NFT and a second NFT;
store the first NFT and the second NFT, wherein the second NFT is generated based at least on a first interaction to be performed between a first computing system and a second computing system;
transmit the first NFT to the first computing system;
transmit the second NFT to the second computing system:
receive the first NFT from the first computing system, wherein:
the first NFT is associated with a first digital folder;
the first digital folder is related to the first computing system; and
the first NFT comprising information about digital assets stored in the first digital folder;
receive the second NFT from the second computing system, wherein:
the second NFT is associated with a second digital folder;
the second digital folder is related to the second computing system; and,
the second NFT comprises a first request from the second computing system for the first interaction to be performed between the first computing system and the second computing system;
determine whether a notification comprising information relating to movement of the first NFT from the first digital folder to a third digital folder is received, wherein the third digital folder is related to the first computing system;
in response to determining that the notification is not received, search a blockchain stored in a memory to identify an association of the first NFT with the first digital folder prior to searching a first plurality of nodes in a blockchain network;
search the first plurality of nodes in the blockchain network to identify the first digital folder associated with the first NFT;
search a second plurality of nodes in the blockchain network to identify the second digital folder associated with the second NFT, wherein each node of the first plurality of nodes and each node of the second plurality of nodes stores a respective copy of the blockchain of the blockchain network;
establish a communication between the first plurality of nodes and the second plurality of nodes; and
perform, based at least in part upon the information about the digital assets stored in the first digital folder, the first interaction corresponding to the first request between the first digital folder and the second digital folder over the communication, the first interaction comprising transferring the digital assets from the first digital folder to the second digital folder.

16. The non-transitory computer-readable medium of claim 15, wherein the notification is received from the first computing system.

17. The non-transitory computer-readable medium of claim 15, wherein the instructions, when executed by the one or more processors, cause the one or more processors to, in response to determining that the notification is received:

associate the first NFT with the third digital folder in the blockchain network;

search the blockchain network to identify the third digital folder associated with the first NFT;

search the blockchain network to identify the second digital folder associated with the second NFT; and perform, based at least in part upon the information about the digital assets stored in the third digital folder, a second interaction corresponding to the first request between the third digital folder and the second digital folder.

18. The non-transitory computer-readable medium of claim 17, wherein the second interaction comprises transferring the digital assets from the third digital folder to the second digital folder.

19. The non-transitory computer-readable medium of claim 17, wherein:

the first digital folder comprises first additional digital assets;

the second digital folder comprises second additional digital assets; and the first additional digital assets are different from the second additional digital assets.

20. The non-transitory computer-readable medium of claim 15, wherein the instructions, when executed by the one or more processors, cause the one or more processors to:

record an association of the first NFT with the first digital folder in the blockchain network; and record an association of the second NFT with the second digital folder in the blockchain network.

* * * * *